US006715034B1

United States Patent
Kleiman et al.

(10) Patent No.: US 6,715,034 B1
(45) Date of Patent: Mar. 30, 2004

(54) SWITCHING FILE SYSTEM REQUEST IN A MASS STORAGE SYSTEM

(75) Inventors: Steven R. Kleiman, Los Altos, CA (US); Radek Aster, Campbell, CA (US); Anthony Aiello, Santa Clara, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 09/460,311

(22) Filed: Dec. 13, 1999

(51) Int. Cl.[7] ............................................. G06F 13/14
(52) U.S. Cl. ...................................... 711/114
(58) Field of Search ................................ 711/114, 154

(56) References Cited

U.S. PATENT DOCUMENTS

| 4,825,354 A | 4/1989 | Agrawal et al. ............ 364/200 |
| 4,937,763 A | 6/1990 | Mott .......................... 364/550 |
| 4,984,272 A | 1/1991 | McIlroy et al. ............... 380/25 |

(List continued on next page.)

FOREIGN PATENT DOCUMENTS

| EP | 0537098 | 4/1993 |
| JP | 1-273395 | 11/1989 |
| JP | 5-197495 A | 8/1993 |
| WO | WO 00/68795 A1 | 5/2000 |
| WO | WO 01/43368 A1 | 6/2001 |
| WO | WO 02/44862 A2 | 11/2001 |

OTHER PUBLICATIONS

IBM. "Fibre Channel Standard Hub–Loop Redundancy for Higher RAS." IBM Technical Disclosure Bulletin, vol. 37 No. 4A, Apr. 1, 1994, pp. 383–385.

Kembel. "In–Depth Fibre Channel Arbitrated Loop." Fibre Channel Consultant, Northwest Learning Associates, Apr. 1997, pp. 7, 16–20.

Nass. "Connect Disk Arrays to EISA or PCI Buses." Electronic Design, vol. 41, No. 23, Nov. 11, 1993, pp. 152–154.

Sebring Systems. "Optical Backplanes Driven by Sebring Rings Can Supply 40–160 Terabits/Sec of Wire–Speed Routing by 2002." Sebring Systems, Inc., Otc. 16, 1999, pp. 1–4.

Sebring Systems. "Sebring Rings in Networking." Sebring Systems, Inc., Aug. 9, 1999, pp. 1–14.

Sebring Systems. "Sebring Theory of Ring Operation (STROP)." Sebring Systems, Inc., Sep. 9, 1999, pp. 1–66.

*Primary Examiner*—Kevin L. Ellis
(74) *Attorney, Agent, or Firm*—Swernofsky Law Group PC

(57) ABSTRACT

The invention provides a method and system for routing or switching file system requests in a mass storage system. The mass storage system includes multiple storage devices coupled using fiber channel to a routing or switching device disposed internally within each shelf of mass storage devices in the mass storage system, and coupled directly to each individual mass storage device in that shelf. The switching device receives requests, identifies an individual target storage device for each such request, and sends each such request to its designated target storage device. The switching device also receives responses to such requests from each individual storage device within the shelf, and sends those responses from the storage device to an external medium with which the response can be delivered to the original requester. One advantage of the switching device is that the switching device can maintain communication bandwidth between the mass storage devices and external devices approximately equal to the communication bandwidth of a single fiber channel times the number of point-to-point connections.

12 Claims, 3 Drawing Sheets

U.S. PATENT DOCUMENTS

| | | |
|---|---|---|
| 5,067,099 A | 11/1991 | McCown et al. ............ 364/550 |
| 5,113,442 A | 5/1992 | Moir ........................... 380/25 |
| 5,144,659 A | 9/1992 | Jones ............................ 380/4 |
| 5,202,983 A | 4/1993 | Orita et al. ................. 395/600 |
| 5,222,217 A | 6/1993 | Blount et al. ............... 395/325 |
| 5,257,391 A | 10/1993 | DuLac et al. |
| 5,283,830 A | 2/1994 | Hinsley et al. ................ 380/25 |
| 5,572,711 A | 11/1996 | Hirsch et al. ................ 395/500 |
| 5,617,568 A | 4/1997 | Ault et al. .................. 395/612 |
| 5,668,958 A | 9/1997 | Bendert et al. ............. 710/128 |
| 5,675,782 A | 10/1997 | Montague et al. .......... 395/609 |
| 5,689,701 A | 11/1997 | Ault et al. .................. 395/610 |
| 5,737,523 A | 4/1998 | Callaghan et al. ..... 395/187.01 |
| 5,761,669 A | 6/1998 | Montague et al. .......... 707/103 |
| 5,819,292 A | 10/1998 | Hitz et al. ................... 707/203 |
| 5,825,877 A | 10/1998 | Dan et al. ...................... 380/4 |
| 5,841,997 A | 11/1998 | Bleiweiss et al. |
| 5,854,903 A | 12/1998 | Morrison et al. |
| 5,876,278 A | 3/1999 | Cheng ........................ 454/184 |
| 5,890,959 A | 4/1999 | Pettit et al. ................. 454/184 |
| 5,915,087 A | 6/1999 | Hammond et al. .... 395/187.01 |
| 5,931,935 A | 8/1999 | Cabrera et al. ............. 710/260 |
| 5,963,962 A | 10/1999 | Hitz et al. ................... 707/202 |
| 6,098,155 A * | 8/2000 | Chong, Jr. .................. 711/138 |

* cited by examiner

SWITCHING FILE SYSTEM REQUEST IN A MASS STORAGE SYSTEM

BACKGROUND OF THE INVENTION

1. Field of the Invention

This invention relates to routing or switching file system requests in a mass storage system, such as one having multiple storage devices.

2. Related Art

Mass storage systems can include multiple storage devices, such as disk drives. When a file server request arrives at the mass storage system, the request is identified as destined for one of the multiple storage devices, and is sent to that identified storage device for processing (and for a possible response). In a first set of known devices, the file server request is received by a hub device, which propagates the file server request to its target storage device, using a fiber channel arbitrated loop interface. Thus, the hub is coupled to each shelf of mass storage devices (where each shelf includes an enclosure housing a plurality of storage devices) using a star configuration of fiber channel arbitrated loop; thus, the hub couples each shelf to the loop and thus couples each of the mass storage devices to the loop. In a second set of known devices, the file server request is received by a switching device, which identifies the target storage device within the mass storage system. The switching device then sends the file server request directly to the shelf of mass storage devices including the target storage device, using a fiber channel arbitrated loop interface (the loop including each of the mass storage devices in that shelf); the switching device receives responses directly from that shelf of mass storage devices and routes those responses back to the original requesting device making the file server request.

One problem with known systems is that the fiber channel arbitrated loop is subject to error, including the possibility that the fiber channel has a break, disconnection, or other failure, and the additional possibility that one or more of the storage devices in the mass storage system will fail to forward file system requests to subsequent storage devices in the fiber channel arbitrated loop. In known devices including a hub, the hub monitors each connection to each shelf of mass storage devices (thus, paying attention to each of its ports, as well as to timing and signal requirements for signals on each connection). If the hub detects an error on a loop to or from a mass storage device in a shelf of storage devices, it bypasses the connection to that one shelf of storage devices, and effectively deletes the connectivity to all storage devices in that one shelf.

Although these known systems generally achieve a result of isolating errors in the fiber channel arbitrated loop, they are subject to several drawbacks. In cases when the hub detects errors, file server requests can fail to be sent to the target storage device. Similarly, in cases when the hub detects errors, even if the file server request is properly sent to the target storage device, one or more responses from the target storage device can fail to be properly sent back to the original requesting device. In systems where a hub or switch is used to route file server requests among multiple shelves of mass storage devices, isolating one of the fiber channel arbitrated loops has the effect of isolating an entire shelf of mass storage devices; in these cases, advantages obtained from redundancy of mass storage devices in the shelf (such as in RAID—Redundant Array of Inexpensive Disk—systems) are generally lost.

A first known method for attempting to remedy this problem is to provide redundant system elements, such as a plurality of fiber channel loops, a plurality of couplings between fiber channel loops and individual storage devices, or a plurality of elements at each other single point of failure. Although this first known method generally achieves the result of guarding against failure of the mass storage system, it is subject to several drawbacks. First, redundant system elements have additional cost, thus increasing the cost of the entire mass storage system. Second, system design using redundant system elements is more complex than without using redundant system elements, again increasing the cost of the entire mass storage system. Third, fiber channel drives are subject to failure modes that can bring down multiple fiber channel loops at once (for example, a bad crystal in a fiber channel drive will cause a mismatch in frequency and bring down both fiber channel links to which the fiber channel drive is coupled).

A second known method for attending to remedy this problem is to use serial channel techniques other than fiber channel arbitrated loops. One such alternative serial channel technique is SSA (Serial Storage Architecture), which is less subject to the drawbacks noted of the known art. However, use of SSA is subject to other drawbacks—fiber channel arbitrated loop is a known standard, and thus makes it easier to design systems for use with that known standard.

Accordingly, it would be advantageous to provide a technique for routing or switching file system requests in a mass storage system that is not subject to drawbacks of the known art. Such a technique would preferably include a capability for routing or switching file system requests in a mass storage system that is not subject to failure of either a fiber channel arbitrated loop or of any individual storage device.

SUMMARY OF THE INVENTION

The invention provides a method and system for routing or switching requests in a mass storage system. In a preferred embodiment, the mass storage system includes multiple storage devices coupled using fiber channel to a routing or switching device disposed internally within each shelf of mass storage devices in the mass storage system, and coupled directly to each individual mass storage device in that shelf. The switching device receives requests, identifies an individual target storage device for each such request, and sends each such request to its designated target storage device. The switching device also receives responses to such requests from each individual storage device within the shelf, and sends those responses from the storage device to an external medium with which the response can be delivered to the original requester. One advantage of the switching device is that the switching device can maintain communication bandwidth between the mass storage devices and external devices approximately equal to the communication bandwidth of a single fiber channel times the number of point-to-point connections.

The invention provides an enabling technology for a wide variety of applications for routing or switching requests in a mass storage system, so as to obtain substantial advantages and capabilities that are novel and non-obvious in view of the known art. Examples described below primarily relate to mass storage systems including a plurality of storage devices coupled using fiber channel arbitrated loop, but the invention is broadly applicable to many different types of storage systems.

DETAILED DESCRIPTION OF THE PREFERRED EMBODIMENTS

Figure 1:
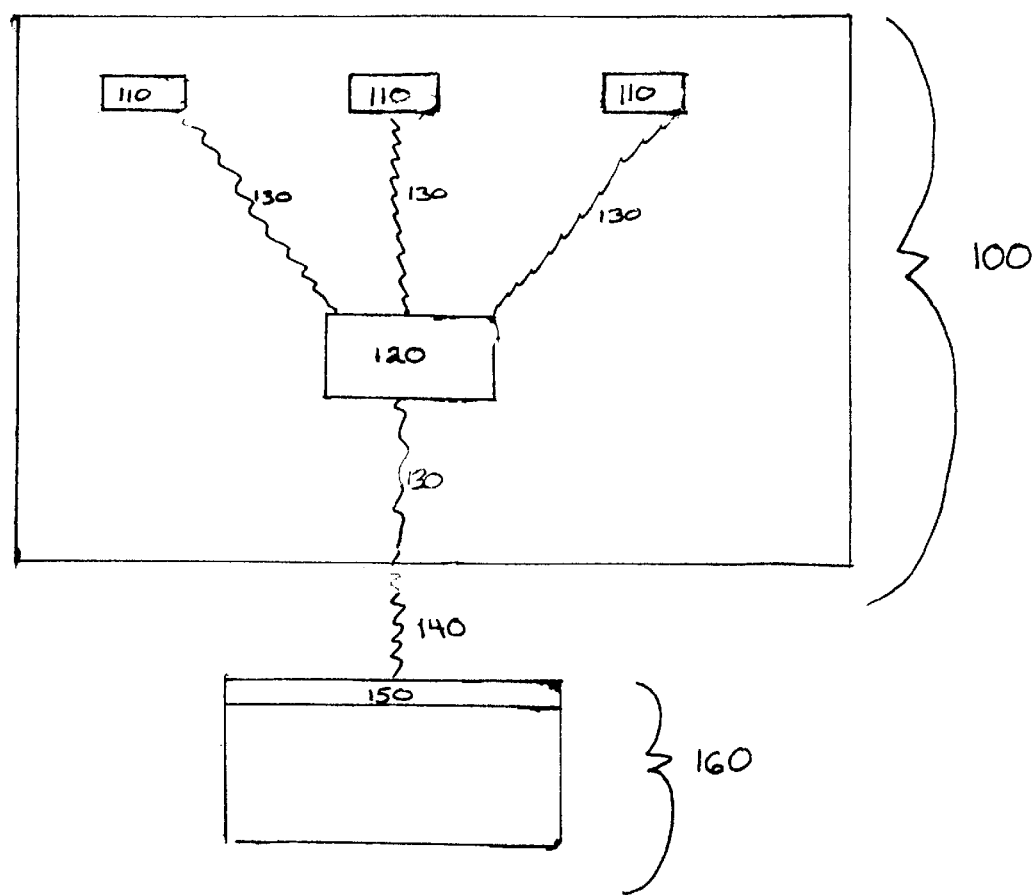
FIG. 1 shows a block diagram of a system for routing or switching requests in a mass storage system.

In the following description, a preferred embodiment of the invention is described with regard to preferred process steps and data structures. Embodiments of the invention can be implemented using general purpose processors or special purpose processors operating under program control, or other circuits, adapted to particular process steps and data structures described herein. Implementation of the process steps and data structures described herein would not require undue experimentation or further invention.

Lexicography

The following terms refer or relate to aspects of the invention as described below. The descriptions of general meanings of these terms are not intended to be limiting, only illustrative.

- client and server—in general, these terms refer to relationships between a client and a server, not necessarily to particular physical devices
- client device and server device—in general, these terms include any device taking on the role of a client or a server in a client-server relationship; there is no particular requirement that any client device or any server device must be an individual physical device (each can be either a single device, a set of cooperating devices, a portion of the device, or some combination thereof)
- communication bandwidth—in general, a measure of the amount of information being sent per unit time between or among devices
- disposed internally—in general, with regard to a mass storage system, a device disposed so as to be treated by external devices as part of that mass storage system
- external medium—in general, a communication medium or a device external to the mass storage system and coupled to the mass storage system for inter-operation therewith
- fiber channel—in general, a communication medium including optical fiber for sending information, including without limitation either (a) point-to-point communication between pairs of devices, or (b) arbitrated communication among a sequence of devices configured in a loop
- hub or switching device—in general, a device for communicating messages among storage devices in a mass storage system and points external to the mass storage device; thus, a connectivity device for storage devices in a mass storage system
- request—in general, a message from a requesting device, to a mass storage system, such as indicating a request to perform a file system operation
- mass storage shelf (or enclosure)—in general, a device used to house one or more storage devices; in a preferred embodiment, each mass storage shelf includes at least a portion of the mass storage system
- mass storage system—in general, a device whose purpose is to provide storage and retrieval of information; in a preferred embodiment, the mass storage system includes one or more storage devices housed in one or more mass storage shelves (or enclosures)
- original requester—in general, the client device that made an original request, and to which one or more responses to that request are to be delivered
- point-to-point connection—in general, a communication link between a sending device and a receiving device
- responses to requests—in general, a message from a device (such as a mass storage system) to a requesting device, such as indicating a response to file system request
- routing or switching—in general, forwarding messages (such as requests or responses to those requests) from a first device (such as a requesting device) to a second device (such as a mass storage device within a mass storage system)
- storage device—in general, a device for storing and retrieving information, such as for example a magnetic storage device, an optical or magneto-optical storage device, or one or more disk drives
- switching device—in general, one or more devices for performing routing or switching As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

FIG. 1 shows a block diagram of a system for routing or switching requests in a mass storage system.

A mass storage system 100 includes a set of storage devices 110, a hub or switching device 120, a set of internal communication links 130, and one or more external communication links 140. The mass storage system 100 is disposed for coupling within a larger system, including at least one communication medium 150 and at least one requesting device 160 (such as a file server client).

In a preferred embodiment, the mass storage system 100 is disposed so as to include the entire set of storage devices 110, the hub or switching device 120, and the internal communication links 130, all within a single physical housing. However, there is no particular requirement that the mass storage system 100 be disposed within a single physical housing, and can instead include more than one physical housing. For example, a first plurality of storage devices 110 can be disposed within a first physical housing such as a first shelf, while a second plurality store devices 110 can be disposed within a second physical housing such as a second shelf. In this example, in a preferred embodiment, the first and second plurality of storage devices 110 would each have their own independent hub or switching device 120 disposed within each shelf.

In a preferred embodiment, each one storage device 110 comprises a mass storage device, such as a magnetic storage device, a magneto-optical or optical storage device, for example as embodied in a disk drive. However, there is no particular requirement that any storage device 110 be constructed or disposed using a particular technology. Moreover, there is no particular requirement that all storage devices 110 are constructed or disposed using the same or similar technologies.

In a preferred embodiment, the hub or switching device 120 includes a device having the capability to receive messages and send those messages to individual ones of the storage devices 110.

For a first example, where the hub or switching device 120 is a hub, the hub is coupled to each one of the storage devices 110 individually, so that the hub can send or receive a message from any one of the storage devices 110 individually without that message having to pass by a second one of the storage devices 110. One preferred configuration couples the storage devices 110 to the hub in a star configuration, so that the hub is coupled to each individual storage device 110 using a separate fiber channel arbitrated loop.

For a second example, where the hub or switching device 120 is a switch, the switch is coupled to each one of the storage devices 110 individually, so that the switch can send or receive a message from any one of the storage devices 110 individually. One preferred configuration couples the storage devices 110 to the switch in a crossbar configuration, so that the switch can couple any individual storage device 110 to any other individual storage device 110, and can couple any individual storage device 110 to an individual external communication link 140.

In a preferred embodiment, the set of internal communication links 130 include fiber channel, disposed in a star configuration, so that each storage device 110 is coupled directly to the hub or switching device 120 using a pair of fiber channel links and forming a fiber channel loop.

The hub or switching device 120 is coupled to the external communication links 140, so as to receive requests from the external communication links 140 and to send those requests to designated storage devices 110, and so as to receive responses to those requests from the storage devices 110 and to send those responses to the external communication links 140.

System Operation

Figure 2:
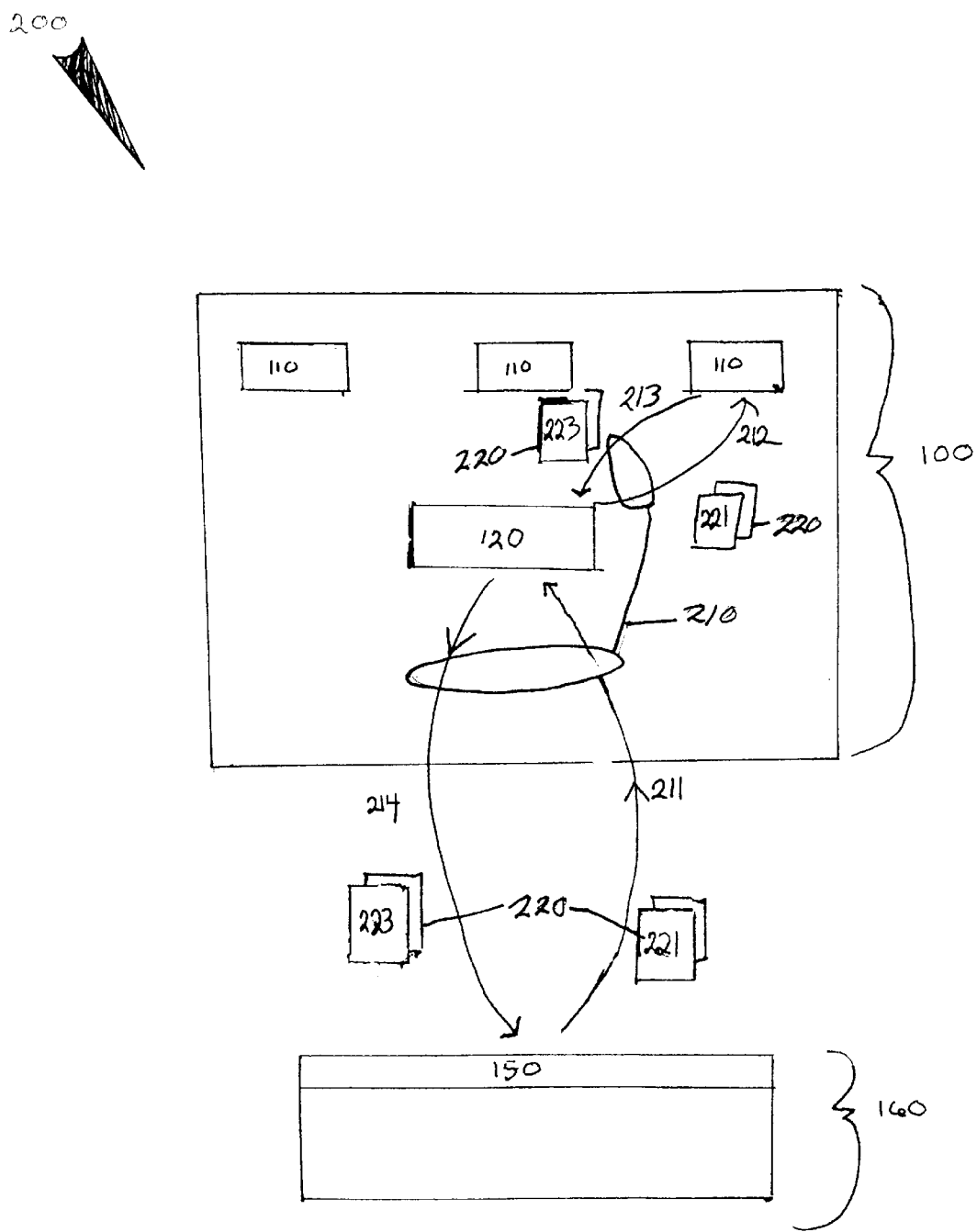
FIG. 2 shows a data flow diagram in a system for routing or switching requests in a mass storage system.

FIG. 2 shows a data flow diagram in a system for routing or switching requests in a mass storage system.

A data flow diagram 200 includes a set of information flow paths 210 and a set of messages 220 used for those information flow paths 210.

A first information flow path 211 includes a request, such as possibly a file server request using NFS or a similar file server request protocol. A set of request messages 221 indicates the nature of the request. In a preferred embodiment, the request can comprise either a single request message 221 or a sequence of more than one request messages 221, as may be appropriate within the structure of a file server request protocol (or other request protocol) and with regard to the nature of the specific request.

The requesting device 160 sends the request messages 221, using the communication medium 150, to the mass storage system 100, for distribution to the appropriate storage device 10 and response thereto. The mass storage system 100 receives the request messages 221 and couples them to the hub or switching device 120. The hub or switching device 120 receives the request messages 221 and determines which storage device 10 to which the request messages 221 should be sent.

A second information flow path 212 includes the internal routing, within the mass storage system 100, of the first set of request messages 221. The hub or switching device 120 forwards the request messages 221 to the specific storage device 110 determined to be the appropriate target of the request messages 221. That storage device 110 receives the request messages 221, and proceeds to process them according to the file server request protocol (or other request protocol).

A third information flow path 213 includes the internal routing, within the mass storage system 100, of a set of response messages 223, corresponding to a response to the original request indicated by the set of request messages 221. The target storage device 110 of the original request messages 221 responds to the original request; the response is indicated by the set of response messages 223. The target storage device 110 sends the response messages 223 to the switching device 120, which receives the response messages 223.

A fourth information flow path 214 includes the response to the original request. The set of response messages 223 indicates the nature of the response to the original request. In a preferred embodiment, the response can comprise either a single response message 223 or a sequence of more than one response messages 223, as may be appropriate within the structure of the file server request protocol (or other request protocol) and with regard to the nature of the specific request and the response thereto.

The hub or switching device 120 sends the response messages 223, using the communication medium 150, to the original requesting device 160.

Method of Operation

Figure 3:
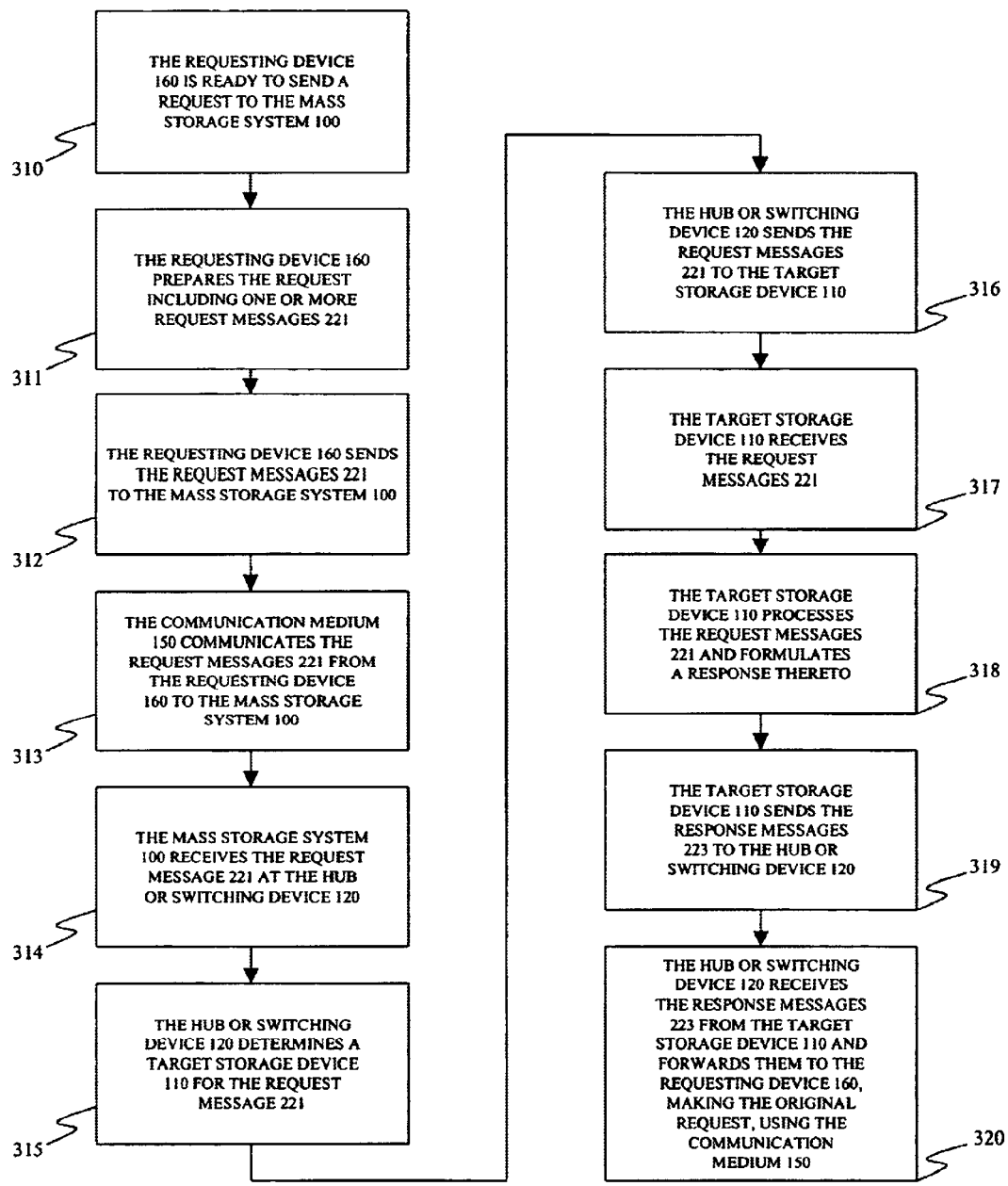
FIG. 3 shows a process flow diagram of a method for operating a system for routing or switching requests in a mass storage system.

FIG. 3 shows a process flow diagram of a method for operating a system for routing or switching requests in a mass storage system.

A method 300 includes a set of flow points and a set of steps. The mass storage system 100, in combination with and cooperation with the communication medium 150 and the requesting device 160, performs the method 300. Although the method 300 is described serially, the steps of the method 300 can be performed by separate elements in conjunction or in parallel, whether asynchronously, in a pipelined manner, or otherwise. There is no particular requirement that the method 300 be performed in the same order in which this description lists the steps, except where so indicated.

At a flow point 310, the requesting device 160 is ready to send a request to the mass storage system 100.

At a step 311, the requesting device 160 prepares the request, including one or more request messages 221, according to the NFS file server protocol (or another appropriate protocol).

At a step 312, the requesting device 160 sends the request messages 221 to the mass storage system 100, using the communication medium 150.

At a step 313, the communication medium 150 communicates the request messages 221 from the requesting device 160 to the mass storage system 100.

At a step 314, the mass storage system 100 receives the request messages 221, at the hub or switching device 120.

At a step 315, the hub or switching device 120 determines a target storage device 110 for the request messages 221.

At a step 316, the hub or switching device 120 sends the request messages 221 to the target storage device 110.

At a step 317, the target storage device 110 receives the request messages 221.

At a step 318, the target storage device 110 processes the request messages 221, and formulates a response thereto. As part of this step, the target storage device 110 prepares the response to the request, including one or more response messages 223, according to the NFS file server protocol (or another appropriate protocol).

At a step 319, the target storage device 110 sends the response messages 223 to the hub or switching device 120, with an indication that the response messages 223 should be forwarded to the requesting device 160 making the original request.

At a step 320, the hub or switching device 120 receives the response messages 223 from the target storage device 110, and forwards them to the requesting device 160 making the original request, using the communication medium 150. After this step, the method 300 has received and handled the request.

The method 300 can be performed one or more times starting from the flow point 310 and continuing therefrom.

Generality of the Invention

The invention has general applicability to various fields of use, not necessarily related to the services described above. For example, these fields of use can include one or more of, or some combination of, the following:

- Mass storage systems including file servers and other devices in combination;
- Mass storage systems including heterogeneous storage devices; and
- Other types of storage systems.

Other and further applications of the invention in its most general form, will be clear to those skilled in the art after perusal of this application, and are within the scope and spirit of the invention.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. Apparatus including
    a plurality of storage devices, a corresponding plurality of fiber channel arbitrated loops each one of which is associated with one of said plurality of storage devices, and a switch or hub coupled to said plurality of fiber channel arbitrated loops; and
    a housing that encloses said plurality of storage devices;
    wherein said fiber channel arbitrated loops are arranged in a star configuration so that each of said plurality of storage devices is coupled directly to said switch or hub within said housing; and
    wherein said switch or hub is disposed to be coupled directly to and to receive messages from a server external to said housing, and to forward said messages independently to individual ones of said storage devices over said fiber channel arbitrated loops.

2. Apparatus as in claim 1, wherein a first one said storage device is capable of communicating with said switch or hub independently of a fiber channel arbitrated loop associated with a second said storage device.

3. Apparatus as in claim 1, wherein said switch or hub receives said messages over another fiber channel arbitrated loop.

4. Apparatus as in claim 1, wherein, for each pair of said storage devices, a first one of said pair is capable of communicating with said switch or hub independently of a state of said fiber channel arbitrated loop associated with a second one of said pair.

5. Apparatus as in claim 1, wherein said switch or hub is disposed for receiving messages independently from an individual one of said storage devices, and is disposed for forwarding said messages independently to said point external to said housing.

6. Apparatus as in claim 3, wherein the storage devices, fiber channel arbitrated loops, and switch or hub are all disposed internally to said housing.

7. Apparatus including
    a housing having a plurality of shelves;
    a plurality of disk drives disposed on at least one of the shelves;
    a plurality of fiber channel arbitrated loops;
    a switch or hub directly connected to each of the plurality of disk drives, with each of said plurality of disk drives coupled over a separate fiber channel arbitrated loop so as to form a star configuration; and
    a server directly connected to the switch or hub so as to be able to access data on the plurality of disk drives through the switch or hub, the server disposed on a separate one of the shelves from the plurality of disk drives.

8. Apparatus as in claim 7, wherein the disk drives, switch or hub, server, and fiber channel arbitrated loops are all disposed internally to the housing.

9. Apparatus as in claim 7, wherein the server is connected to the switch or hub over a fiber channel arbitrated loop.

10. Apparatus as in claim 7, wherein the disk drives are magnetic storage devices.

11. Apparatus as in claim 7, wherein the disk drives are magneto-optical storage devices.

12. Apparatus as in claim 7, wherein the disk drives are optical storage devices.

* * * * *